United States Patent
Cooper

(10) Patent No.: US 9,056,367 B2
(45) Date of Patent: Jun. 16, 2015

(54) CONDUIT

(75) Inventor: Edward L. Cooper, Clarklake, MI (US)

(73) Assignee: ELCO ENTERPRISES, INC., Jackson, MI (US)

( * ) Notice: Subject to any disclaimer, the term of this patent is extended or adjusted under 35 U.S.C. 154(b) by 1207 days.

(21) Appl. No.: 12/606,793

(22) Filed: Oct. 27, 2009

(65) Prior Publication Data

US 2010/0276407 A1     Nov. 4, 2010

Related U.S. Application Data

(60) Provisional application No. 61/108,987, filed on Oct. 28, 2008.

(51) Int. Cl.
| | |
|---|---|
| *B23K 9/10* | (2006.01) |
| *B21D 11/14* | (2006.01) |
| *H01R 43/00* | (2006.01) |
| *F16L 9/14* | (2006.01) |
| *B23K 9/29* | (2006.01) |
| *B23K 9/12* | (2006.01) |
| *B23K 9/28* | (2006.01) |

(52) U.S. Cl.
CPC ........... *B23K 9/295* (2013.01); *Y10T 29/49117* (2015.01); *B23K 9/122* (2013.01); *B23K 9/28* (2013.01)

(58) Field of Classification Search
None
See application file for complete search history.

(56) References Cited

U.S. PATENT DOCUMENTS

| | | | | |
|---|---|---|---|---|
| 2,104,121 | A | * | 1/1938 | Gleason ...................... 140/71 R |
| 2,126,955 | A | * | 8/1938 | Gleason ........................ 464/174 |
| 2,557,764 | A | * | 6/1951 | Renkin ......................... 427/367 |
| 2,998,242 | A | * | 8/1961 | Schwarzbeck et al. ....... 267/204 |
| 3,248,515 | A | * | 4/1966 | Gorman et al. ............. 219/137.9 |
| 3,832,520 | A | * | 8/1974 | Glasser .................... 219/137.52 |
| 4,102,483 | A | * | 7/1978 | Ueyama et al. ............... 228/244 |
| 4,462,533 | A | * | 7/1984 | Furr et al. ..................... 228/119 |
| 4,554,432 | A | | 11/1985 | Raloff |
| 5,165,804 | A | * | 11/1992 | Fisher et al. ................. 384/492 |
| 5,338,917 | A | | 8/1994 | Stuart et al. |
| 5,437,282 | A | * | 8/1995 | Koger et al. .................. 600/463 |
| 5,440,100 | A | | 8/1995 | Stuart et al. |
| 5,491,321 | A | | 2/1996 | Stuart et al. |
| 5,951,539 | A | * | 9/1999 | Nita et al. ..................... 604/526 |
| 7,001,420 | B2 | * | 2/2006 | Speck et al. ................. 623/1.11 |
| 2006/0029494 | A1 | * | 2/2006 | Bruce et al. .................. 415/160 |
| 2006/0196568 | A1 | * | 9/2006 | Leeser et al. ................. 138/149 |
| 2007/0251602 | A1 | | 11/2007 | Gagnon, Jr. et al. |

(Continued)

FOREIGN PATENT DOCUMENTS

| | | | |
|---|---|---|---|
| DE | 0000195236396 A1 | | 1/1996 |
| GB | 339386 | * | 12/1930 |

(Continued)

OTHER PUBLICATIONS

Home of the Wizards, ELCo Enterprises, Inc, 2608 Product Catalog—p. 13, published in the United States by ELCo Enterprises, Inc. on Feb. 11, 2008, provided in IDS.*

(Continued)

*Primary Examiner* — James G Norman
(74) *Attorney, Agent, or Firm* — Mary M. Moyne; Fraser, Trebilcock, Davis & Dunlap, PC

(57) ABSTRACT

A conduit constructed from a coiled wire having an oval or elliptical cross-sectional shape.

14 Claims, 2 Drawing Sheets

(56) References Cited

U.S. PATENT DOCUMENTS

2008/0283505 A1 * 11/2008 Christopher et al. .......... 219/74
2009/0101238 A1    4/2009 Jossick et al.

FOREIGN PATENT DOCUMENTS

| | | | |
|---|---|---|---|
| JP | 2001054220 | * | 1/2001 |
| JP | 02001054220 | * | 2/2001 |
| JP | 2001276975 | * | 2/2001 |
| JP | 2001054220 | * | 3/2001 |
| JP | 2001-276975 | * | 10/2001 |

OTHER PUBLICATIONS

Home of the Wizards, ELCo Enterprises, Inc. 2008 Product Catalog—page 13, published in the United States by ELCo Enterprises, Inc. on Feb. 11, 2008.

* cited by examiner

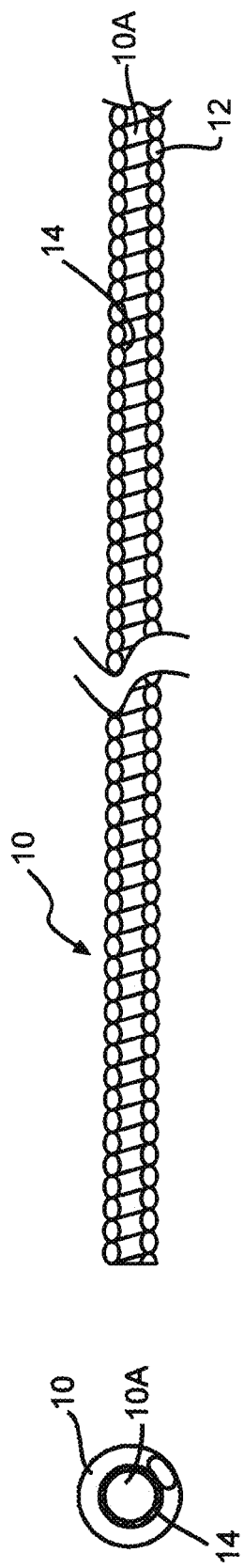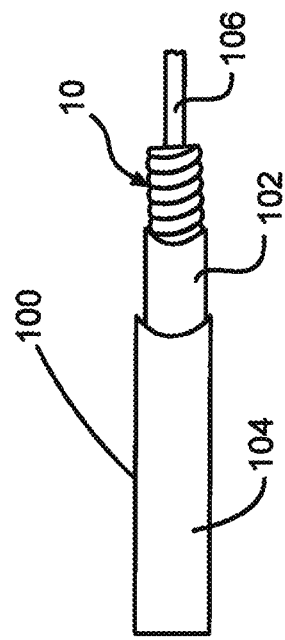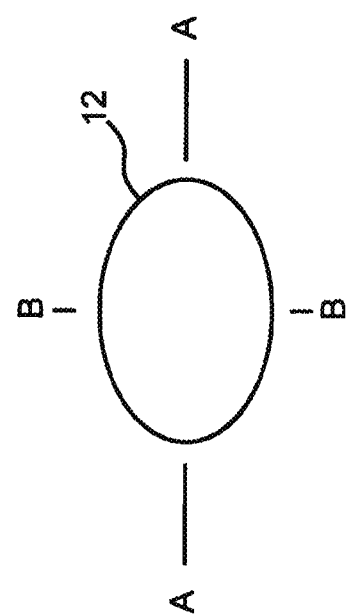

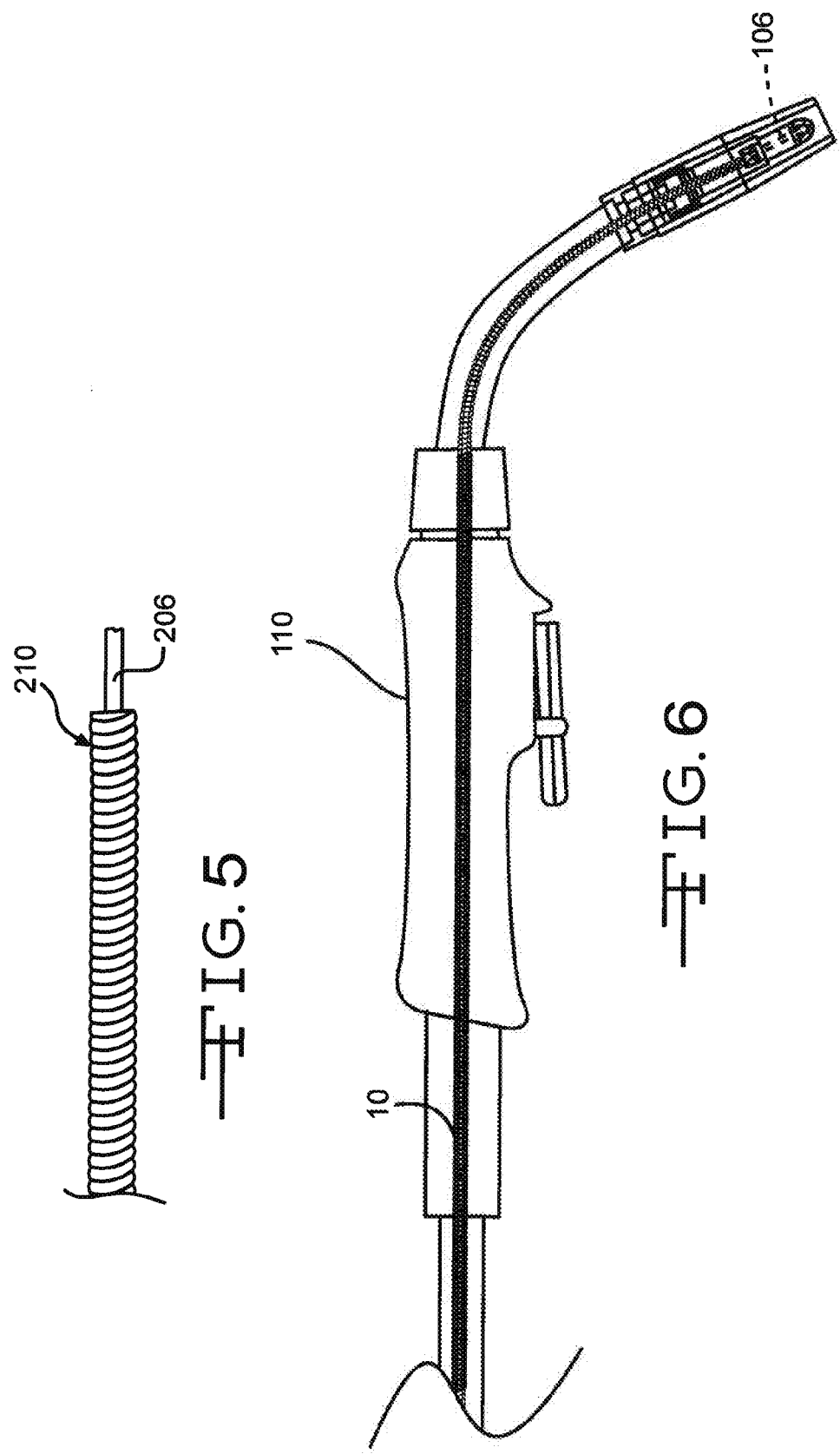

CONDUIT

CROSS REFERENCES TO RELATED APPLICATIONS

This application claims the benefit of U.S. Provisional Application No. 61/108,987, filed Oct. 28, 2008, which is incorporated herein by reference in its entirety, except that the present application supersedes any portion of the above referenced application which is inconsistent with the present application.

STATEMENT REGARDING FEDERALLY SPONSORED RESEARCH OR DEVELOPMENT

Not Applicable

BACKGROUND OF THE INVENTION (1) Field of the Invention

The present invention relates to a conduit for use in a weld wire dispensing system or as a control cable conduit. In particular, the present invention relates to a conduit constructed of coiled wire having an oval or elliptical cross-section.

(2) Description of Related Art

In the past, spring liners for weld torch cables, and weld wire conduits, used in weld wire dispensing systems have been constructed using wire having a rectangular cross-section. However, in instances where the weld torch cable or weld wire conduit is bent or flexed, the edges of the wire forming the conduit are exposed. The exposed edges of the wire forming the conduit damage the surface of the weld wire as the weld wire is pushed or pulled through the conduit in the weld torch cable or weld wire conduit. The sharp edges of the wire "shave" or cut the weld wire as the weld wire is moved through the conduit. The sharp edges also increase the coefficient of friction between the weld wire and the conduit as the weld wire is moved through the weld torch cable or weld wire conduit. The higher coefficient of friction results in more force being required to move the weld wire through the conduit which decreases the overall efficiency of the weld wire dispensing system. The damage to the surface of the weld wire by the exposed edges of the wire forming the conduit also results in shavings and residue collecting in the inner passageway of the conduit. In some instances, the build-up of shavings and residue eventually prevents the weld wire from being pulled or pushed through the conduit. In addition, as the shavings and residue build-up in the conduit, the shavings and residue significantly increase the coefficient of friction between the weld wire and the conduit and thus increase the amount of force needed to push or pull the weld wire through the conduit. The increase in friction also causes drive roll wire slippage in the weld wire dispensing system, as well as burnback in the system. The shavings and residue can also lead to the weld wire being stuck inside the torch contact tip.

In the past, the conduits have also been constructed of wire having a circular cross-section. However, it is difficult to provide a protective coating on only the inner surface of the conduit constructed of round wire. Round wire tends to rotate in dies; therefore, it is extremely difficult to get one (1) side of the round wire in a continuous position as necessary to provide coating on only the inner surface of the conduit.

There remains a need for a conduit to be used as a spring liner or as a control cable conduit which is constructed of wire having an oval or elliptical cross-sectional shape.

BRIEF SUMMARY OF THE INVENTION

A conduit constructed from a coiled wire having an oval or elliptical cross-section. The wire can be galvanized or coated with a zinc and aluminum coating before the wire is coiled to form the conduit. In one (1) embodiment, the wire is wound into a helical coil to form the conduit. In one (1) embodiment, one (1) side (top or bottom) of the wire along the horizontal axis A-A can be provided with a secondary coating so that when the wire is coiled into the conduit, the inner passageway of the conduit is provided with the secondary coating. In one (1) embodiment, the coating is a tungsten sulfide coating. Coating the inner passageway of the conduit reduces the coefficient of friction between the conduit and the weld wire or the actuation cable. The oval or elliptical cross-sectional shape of the wire allows for easier coating of the wire on one (1) side since the wire does not rotate as it moves as round wire tends to do. The conduit can be used as a spring liner for a flexible conduit to be used in a weld wire dispensing system to move weld wire through the system. The conduit can also be used as a control cable conduit to allow an actuation cable to be connected between two (2) points.

The present invention relates to a conduit which is comprised of coiled wire having an essentially oval cross-section.

Further, the present invention relates to a conduit which is comprised of a coiled wire having an essentially elliptical cross-section.

Still further, the present invention relates to a method for forming a conduit which comprises the steps of providing a wire having an essentially oval cross-section and coiling the wire to form the conduit.

Further, the present invention relates to a method for forming a conduit which comprises the steps of providing a wire having an essentially elliptical cross-section and coiling the wire to form the conduit.

Further still, the present invention relates to a method for forming a control cable which comprises the steps of providing a wire having an essentially oval cross-section, providing an actuation cable, coiling the wire to form a conduit, and inserting the activation cable through the conduit.

Further still, the present invention relates to a method for forming a control cable which comprises the steps of providing a wire having an essentially elliptical cross-section, providing an actuation cable, coiling the wire to form a conduit, and inserting the activation cable through the conduit.

Further still, the present invention relates to a method for forming a conduit for use in a weld wire dispensing system which comprises the steps of providing a wire having an essentially oval cross-sectional shape, providing an outer sleeve, providing a spatter resistant jacket, coiling the wire to form a spring liner, mounting the outer sleeve over the spring liner, and mounting the spatter resistant jacket over the outer sleeve and the spring liner.

Further still, the present invention relates to a method for forming a conduit for use in a weld wire dispensing system which comprises the steps of providing a wire having an essentially elliptical cross-section, providing an outer sleeve, providing a spatter resistant jacket, coiling the wire to form a spring liner, mounting the outer sleeve over the spring liner, and mounting the spatter resistant jacket over the outer sleeve and the spring liner.

The substance and advantages of the present invention will become increasingly apparent by reference to the following drawings and the description.

BRIEF DESCRIPTION OF THE DRAWINGS

FIG. 1 is a cross-sectional view of the conduit 10 showing the wire 12.

FIG. 2 is a cross-sectional view of the wire 12.

FIG. 3 is a side view of the flexible conduit 100 showing the spring liner 10, the outer sleeve 102 and the outer jacket 104.

FIG. 4 is an end view of the conduit 10 showing the inner passageway 10A having the coating 14.

FIG. 5 is a side view of a control cable conduit 210.

FIG. 6 is a cross-sectional view of the conduit 10 mounted in a torch 110.

DETAILED DESCRIPTION OF THE INVENTION

The present invention is a conduit 10 or 210 constructed from coiled wire 12 having an essentially oval or elliptical cross-section. In one (1) embodiment, the wire 12 has an essentially oval cross-section. In another embodiment, the wire 12 has an essentially elliptical cross-section. In one (1) embodiment, the wire 12 has an oval cross-sectional shape and has one (1) axis of symmetry. In another embodiment, the wire 12 has an elliptical cross-sectional shape and has two (2) axes of symmetry. In one (1) embodiment, the oval shape of the wire 12 is essentially an egg-shaped smooth, convex closed curve. In one (1) embodiment, the wire 12 has a horizontal or major axis A-A and a vertical or minor axis B-B (FIG. 2). It is understood that the wire 12 does not have a circular cross-section and that the length of the horizontal axis A-A of the wire 12 is not equal to the length of the vertical axis B-B. In general, the cross-sectional shape of the wire 12 is such that the wire 12 does not have any sharp corners or flat edges. The wire 12 used to form the conduit 10 or 210 can be constructed of any material well known in the art which is used to construct conduits. In one (1) embodiment, the wire 12 is constructed of carbon steel. In one (1) embodiment, the wire 12 is formed by drawing the source material through a special die. Once the wire 12 has the correct cross-section, a spring coiler is used to wind the wire 12 into a coil to be used as the conduit 10 or 210. In one (1) embodiment, the wire 12 is wound into a helical coil. In one (1) embodiment, the wire 12 is tightly wound to form the conduit 10 or 210.

In one (1) embodiment, the conduit 10 is used as a spring liner in the interior of weld torch cables and weld wire conduits, which are part of a weld wire dispensing system (FIG. 3). The weld torch cables and weld wire conduits are used to guide the weld wire 106 from the wire source to the torch. The weld torch cables and weld wire conduits protect the weld wire 106 and create a path from the wire source to the torch for the weld wire 106. The weld wire 106 generally moves in one (1) direction in the spring liner 10 from the wire source to the torch. In one (1) embodiment, the weld torch cable or welding wire conduit is a flexible conduit 100 which is able to bend and move as the weld wire 106 is moved through the flexible conduit 100. The bendability and moveability of the flexible conduit 100 allows the weld wire 106 to be moved along a variety of different shaped paths without damage to the welding wire 106. The spring liner 10 of the present invention is more bendable and movable than a liner constructed of a solid tube. The use of the spring liner 10 enables the flexible conduit 100 to be moved into a shape having a tighter or smaller radius than can be achieved using liners constructed from a solid tube. The flexible conduit 100 is used in robotic and semi-automatic or hand-held welding applications where flexibility and bending movement of the welding wire 106 and weld torch cable or weld wire conduit are required to allow the robot or welder to access a variety of weld-joint configurations. The flexible conduit 100 includes an outer sleeve 102 over the spring liner 10. In one (1) embodiment, the flexible conduit 100 also has a spatter resistant outer jacket 104 over the outer sleeve 102 and spring liner 10. In another embodiment, the conduit 10 is a torch liner used in a welding torch 110 to enable weld wire 106 to be fed into and through a welding torch 110 to the contact tube at the end of the welding torch 110 (FIG. 6). In one (1) embodiment, the torch liner does not have an outer sleeve or an outer jacket.

In another embodiment, the conduit 210 is used as the control cable conduit 210 for control cables. In this embodiment, the actuation cable 206 moves in the control cable conduit 210 to actuate a result at one (1) end of the actuation cable 206. In this embodiment, the actuation cable 206 moves in both directions in the control cable conduit 210. The actuation cable 206 can be a wire having single or multiple strands or wires or a cable. In one (1) embodiment, the control cable conduit 210 does not have an outer cover. The control cable conduit 210 can be used with clutch cables, brake cables, throttle control cables, remote mirror control cables, door latch cables, and trunk and hood latch cables.

The size of the wire 12 used to construct the conduit 10 or 210 depends on the intended use of the conduit 10 or 210. The number of windings per inch in the conduit 10 or 210 is dependent on the size of the wire 12, as well as the use of the conduit 10 or 210. In one (1) embodiment, where the wire 12 has a length along the horizontal or major axis A-A of approximately 0.050 inch (1.26 mm) and a width along vertical or minor axis B-B of approximately 0.033 inch (0.83 mm), the conduit 10 or 210 has approximately 20 windings per inch (0.8 windings per mm). In another embodiment, where the wire 12 has a length along the horizontal or major axis A-A of approximately 0.080 inch (2.03 mm) and a width along the vertical or minor axis B-B of approximately 0.052 (1.32 mm), the conduit 10 or 210 has approximately 12½ windings per inch (0.5 windings per mm). In another embodiment, where the wire 12 has a length along the horizontal or major axis A-A of approximately 0.110 inch (2.79 mm) and a width along the vertical or minor axis B-B of approximately 0.072 inch (1.83 mm), the conduit 10 or 210 has approximately 9 windings per inch (0.4 windings per mm). The oval or elliptical cross-sectional shape of the wire 12 allows for a greater number of windings per inch than in a conduit constructed of a conventional, rectangular wire. The increase in the number of windings per length of the conduit 10 or 210 increases the flexibility or bendability of the conduit 10 or 210. In one (1) embodiment, the conduit 10 or 210 has an outer diameter of approximately 0.18 inches (4.57 mm) and an inner diameter of approximately 0.08 inches (2.03 mm).

The oval or elliptical cross-sectional shape of the wire 12 used to construct the conduit 10 or 210 results in less area of contact between the conduit 10 or 210 and the weld wire 106 or actuation cable 206 as the weld wire 106 or actuation cable 206 moves in or through the conduit 10 or 210. The shape of the wire 12 significantly reduces the area of contact between the conduit 10 or 210 and the weld wire 106 or actuation cable 206 particularly where the conduit 10 or 210 is bent or shaped into essentially a circle or any other shape which contains dramatic bends. Less contact results in a lower coefficient of friction as the weld wire 106 or actuation cable 206 is pulled or pushed through the conduit 10 or moved in the conduit 210. In addition, since the oval or elliptical cross-sectional shape of the wire 12 eliminates sharp edges, the conduit 10 or 210 does not shave the weld wire 106 or actuation cable 206 as the weld wire 106 or actuation cable 206 is moved through or in the conduit 10 or 210. The elimination of wire shaving reduces the coefficient of friction between the conduit 10 or 210 and the weld wire 106 or activation cable 206. The elimination of shaving also reduces the build-up of shavings and residue in the inner passageway 10A of the conduit 10 or 210 which tends to hinder the movement of the weld wire 106 or actuation cable 206 through or in the conduit 10 or 210. In addition, since there are no sharp edges on the conduit 10 or 210, there is less chance of damaging the weld wire 106 or actuation cable 206 as the weld wire 106 or actuation cable 206 is moved through or in the conduit 10 or 210. The conduit 10 or 210 can be bent or flexed into any shape and in any direction without creating sharp edges. Thus, bending or flexing the conduit 10 or 210 does not increase the chance of damage to the weld wire 106 or activation cable 206 or increase the frictional contact between the conduit 10 or 210 and the weld wire 106 or activation cable 206.

In one (1) embodiment, prior to coiling the wire 12 to form the conduit 10 or 210 the entire wire 12 is galvanized. In one (1) embodiment, the entire wire 12 is provided with a zinc and aluminum coating known as Bezinal®. In one (1) embodiment, the wire 12 includes a secondary coating 14. In one (1) embodiment, the wire 12 has only the secondary coating 14. The wire 12 has a first side and an opposed second side extending along the horizontal or major axis A-A. In one (1) embodiment, only one (1) side of the wire 12 is provided with the secondary coating 14. In one (1) embodiment, the wire 12 is coated with the secondary coating 14 before the wire 12 is coiled into the conduit 10 so that when the wire 12 is coiled to form the conduit 10 or 210 only the inner passageway 10A of the conduit 10 or 210 has the secondary coating 14. The inner surface or inner passageway 10A of the conduit 10 or 210 is coated to lower the coefficient of friction between the weld wire 106 or actuation cable 206 and the conduit 10 or 210 as the weld wire 106 or actuation cable 206 is pulled or pushed through the conduit 10 or 210 along the inner passageway 10A. In one (1) embodiment, the coating 14 is applied by spraying the wire 12 with the coating. The oval or elliptical cross-sectional shape of the wire 12 allows for easier coating of the wire 12 on only one (1) side which results in only the inner passageway 10A of the conduit 10 being coated. The wire 12 is easier to handle and easier to coat on only one (1) side since the wire 12 does not tend to roll. In one (1) embodiment, the secondary coating 14 is comprised of tungsten sulfide. Coating only the inner passageway 10A of the conduit 10 or 210 is important when the conduit 10 is used as a spring liner and an outer sleeve 102 is provided over the spring liner 10. By not coating the side of the wire 12 forming the outer surface of the spring liner 10, the outer sleeve 102 is able to be secured over the spring liner 10 without slipping off.

In the foregoing description, various features of the present invention are grouped together in one or more embodiments for the purpose of streamlining the disclosure. This method of disclosure is not to be interpreted as reflecting an intention that the claimed embodiments require more features than are expressly recited in each claim. Rather, as the following claims reflect, inventive aspects lie in less than all features of a single foregoing disclosed embodiment. Thus, the following claims are incorporated by reference herein in their entirety, with each claim standing on its own as a separate embodiment of the present invention.

It is intended that the foregoing description be only illustrative of the present invention and that the present invention be limited only by the hereinafter appended claims.

I claim:

1. A conduit comprised of a single wire coiled to form the conduit, the wire having an essentially oval cross-section with only one axis of symmetry.

2. The conduit of claim 1 wherein the wire has a horizontal axis with opposed first and second sides extending along the horizontal axis and wherein a coating is provided on only the first side of the wire so that when the wire is coiled to form the conduit, the first side of the wire forms an inner passageway of the conduit so that the coating is provided on the inner passageway of the conduit.

3. The conduit of claim 2 wherein the coating is a tungsten sulfide coating.

4. The conduit of claim 1 wherein the wire has a zinc and aluminum coating.

5. The conduit of claim 1 wherein the conduit is a spring liner configured to be used in a weld wire dispensing system, wherein the weld wire dispensing system includes a flexible conduit which can move and bend, and wherein the spring liner is configured to be mounted in the flexible conduit to enable weld wire to be moved through the flexible conduit while the flexible conduit is bent without damaging the weld wire.

6. A method for forming a conduit which comprises the steps of:
   a. providing a wire having an essentially oval cross-section with only one axis of symmetry; and
   b. coiling the wire to form the conduit.

7. The method of claim 6 wherein further in step a), the wire has a zinc and aluminum coating.

8. The method of claim 6 wherein the wire has a horizontal axis with opposed first and second sides extending along the horizontal axis and wherein after step a), a coating is provided on only the first side of the wire so that in step b) when the wire is coiled to form the conduit, the first side of the wire forms an inner passageway of the conduit so that the coating is provided on the inner passageway of the conduit.

9. A method for forming a control cable which comprises the steps of:
   a. providing a wire having an essentially oval cross-section with only one axis of symmetry;
   b. providing an actuation cable;
   c. coiling the wire to form a conduit; and
   d. inserting the activation cable through the conduit.

10. The method of claim 9 wherein further in step a), the wire has a zinc and aluminum coating.

11. The method of claim 9 wherein the wire has a horizontal axis with opposed first and second sides extending along the horizontal axis and wherein after step a), a coating is provided on only the first side of the wire so that when the wire is coiled to form the conduit, the first side of the wire forms an inner passageway of the conduit so that the coating is provided on the inner passageway of the conduit.

12. A method for forming a flexible conduit for use in a weld wire dispensing system which comprises the steps of:
   a. providing a wire having an essentially oval cross-sectional shape with only one axis of symmetry;
   b. providing an outer sleeve;
   c. providing a spatter resistant jacket;
   d. coiling the wire to form a spring liner;
   e. mounting the outer sleeve over the spring liner; and
   f. mounting the spatter resistant jacket over the outer sleeve and the spring liner.

13. The method of claim 12 wherein further in step a), the wire has a zinc and aluminum coating.

14. The method of claim 12 wherein the wire has a horizontal axis with opposed first and second sides extending along the horizontal axis and wherein after step a), a coating is provided on only the first side of the wire so that in step d) when the wire is coiled to form the spring liner, the first side of the wire forms an inner passageway of the spring liner so that the coating is provided on the inner passageway of the spring liner.

* * * * *